(12) United States Patent
Fennel et al.

(10) Patent No.: US 7,537,294 B2
(45) Date of Patent: May 26, 2009

(54) VEHICLE BRAKING SYSTEM WITH ACTIVE HYDRAULIC BRAKE FORCE ASSISTANCE AND CONTROL METHOD FOR THE SAME

(75) Inventors: Helmut Fennel, Bad Soden (DE); Thomas Sticher, Reinheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 71 days.

(21) Appl. No.: 10/512,165

(22) PCT Filed: Apr. 28, 2003

(86) PCT No.: PCT/EP03/04277

§ 371 (c)(1), (2), (4) Date: Oct. 18, 2004

(87) PCT Pub. No.: WO03/093082

PCT Pub. Date: Nov. 13, 2003

(65) Prior Publication Data

US 2005/0173978 A1    Aug. 11, 2005

(30) Foreign Application Priority Data

Apr. 27, 2002   (DE) ................................ 102 18 973

(51) Int. Cl.
*B60T 8/60* (2006.01)
(52) U.S. Cl. .................... 303/155; 303/114.3
(58) Field of Classification Search ............. 303/114.3, 303/155, 113.4, 157, 166, 116.1, 3, 10, 11, 303/15, 114.1, 115.1, 115.4
See application file for complete search history.

(56) References Cited

U.S. PATENT DOCUMENTS

| 4,962,824 | A | * | 10/1990 | Hagiya et al. ............... 180/197 |
| 5,918,948 | A | * | 7/1999 | Burgdorf et al. ......... 303/113.2 |
| 5,967,624 | A | * | 10/1999 | Graber et al. ............ 303/113.4 |
| 6,039,411 | A | * | 3/2000 | Tozu et al. ............... 303/116.1 |
| 6,234,589 | B1 | * | 5/2001 | Yoshida ..................... 303/157 |

(Continued)

FOREIGN PATENT DOCUMENTS

DE    41 02 496 A1    2/1992

(Continued)

OTHER PUBLICATIONS

Machine Translation JP 10-315938, Taniguchi.*

(Continued)

*Primary Examiner*—Melanie Torres
(74) *Attorney, Agent, or Firm*—RatnerPrestia

(57) ABSTRACT

In a method of controlling a hydraulic vehicle brake system with active hydraulic brake force boosting, wherein the driver can introduce brake pressure into a master brake cylinder with an actuating device, wherein the pressure introduced by the driver is boosted by an active hydraulic pressure increasing unit, a braking request or a suspected braking request of the driver is determined and, when a braking request or a suspected braking request of the driver is detected, a separating valve that is arranged in a line connecting the master brake cylinder and the hydraulic pressure increasing unit is opened or remains open and the pressure increasing unit is actuated for pressure generation purposes.

10 Claims, 1 Drawing Sheet

U.S. PATENT DOCUMENTS 7,063,394 B2 * 6/2006 Mueller et al. ........... 303/114.1

FOREIGN PATENT DOCUMENTS

| | | | |
|---|---|---|---|
| DE | 44 46 525 A1 | 6/1996 |
| DE | 196 07 048 A1 | 8/1997 |
| DE | 196 15 294 A1 | 10/1997 |
| DE | 196 32 130 A1 | 1/1998 |
| DE | 197 13 715 A1 | 10/1998 |
| DE | 198 13 912 A1 | 9/1999 |
| DE | 199 05 660 A1 | 5/2000 |
| DE | 199 43 601 A1 | 3/2001 |
| DE | 100 60 498 A1 | 10/2001 |
| JP | 08080822 A * | 3/1996 |
| JP | 10315938 A * | 12/1998 |
| WO | WO0208035 A1 * | 1/2002 |

OTHER PUBLICATIONS

Machine Translation JP 8-80822, Kusunoki et al.*
International Search Report of Application No. PCT/EP03/04277 dated Aug. 29, 2003.
German Search Report of Application No. 102 18 973.0 dated Mar. 26, 2003.

* cited by examiner

US 7,537,294 B2

VEHICLE BRAKING SYSTEM WITH ACTIVE HYDRAULIC BRAKE FORCE ASSISTANCE AND CONTROL METHOD FOR THE SAME

TECHNICAL FIELD

The present invention relates to a method of controlling a hydraulic vehicle brake system with an active hydraulic brake force boosting, wherein the driver can introduce brake pressure into a master brake cylinder by means of an actuating device, preferably a brake pedal, and wherein the pressure introduced by the driver is boosted by means of an active hydraulic pressure increasing unit, in particular a hydraulic pump.

The invention likewise relates to a hydraulic brake system for vehicles including a master brake cylinder operable by means of an actuating device, preferably a brake pedal, and including at least one pump, the pressure of which can be applied to at least one wheel brake of the vehicle for the purpose of producing hydraulic brake force boosting, which pump is adapted to be connected on the inlet side (suction side) to the master brake cylinder by way of at least one hydraulic conduit into which a change-over valve is inserted, while the pump is adapted to be connected on the outlet side (pressure side) to at least one wheel brake of the vehicle by way of at least one hydraulic conduit and to the master brake cylinder by way of at least one hydraulic conduit into which a separating valve is inserted.

BACKGROUND OF THE INVENTION

Vacuum brake boosters require a vacuum supply from the engine in order to assist the pedal force to be generated by the driver. Currently, a sufficient vacuum supply for brake force assistance becomes more rare at an increasing rate in new engine technology such as gasoline direct injection engines or Diesel engines. Additional auxiliary energy becomes necessary to assist the driver in braking. In determined systems, the driver's force is converted into hydraulic pressure by means of a vacuum brake booster and a tandem master brake cylinder (TMC), said hydraulic pressure being measured by pressure sensors at the outlet of the tandem master brake cylinder. One possibility of the additional brake force assistance is realized in brake systems with active hydraulic brake force assistance in that additional hydraulic pressure is produced by means of a pressure increasing unit.

Due to inertias and clearances in the system and due to the limited capacity of the pump, it is problematic in this pressure development to achieve a uniform pressure buildup with a desired characteristic curve.

BRIEF SUMMARY OF THE INVENTION

An object of the invention is to improve and further develop a method and a brake system of the type referred to hereinabove in such a fashion that its shortcomings are avoided. The objective is in particular to design the brake system and the method in such a fashion that the brake pressure buildup is improved at the beginning of a braking operation.

This object is achieved by the features of the independent patent claims.

In a method of the above-mentioned type, the invention according to claim 1 arranges that a braking request or a suspected braking request of the driver is determined and, when a braking request or a suspected braking request of the driver is detected, a separating valve that is arranged in a line connecting the master brake cylinder and the hydraulic pressure increasing unit is opened or remains open and the pressure increasing unit is actuated for pressure generation purposes.

In a method of this type with 'active' hydraulic brake force boosting, at least part of the brake assistance can be produced actively by means of the pressure increasing unit. According to the invention, however, the pressure increasing unit in the wheel brakes is actuated for active brake force boosting already after a braking request or a suspected braking request of the driver is detected. Advantageously, it is thus possible in a case of need to realize a considerably quicker pressure rise in the system and, hence, increase the efficiency of the overall system. This is because the pump has already started up when subsequently the driver depresses the brake pedal further.

Preferably a pump provided in the brake system, in particular a hydraulic pump already provided in brake systems with an anti-lock system (ABS) or driving dynamics control (ESP system), is used for active brake force boosting. Therefore, the advantages of the invention can be realized without entailing higher expenditure in components. Another advantage lies in the fact that brake force boosting is principally freely adjustable by way of a corresponding actuation of the pump and the separating valve.

Any type of pump can be used as a pump that has a sufficiently high capacity to supply a defined volume of the pressure fluid fast enough into the wheel brakes. Preferably, piston pumps are employed. Piston pumps are less expensive than gear pumps and advantageous in terms of wear.

When pressure is built up by actuating the pump and with the separating valve opened, advantageously, a possibly existing change-over valve between the inlet side of the pump and the master brake cylinder is opened to allow the aspiration of pressure fluid through or out of the master brake cylinder and supply thereof through the pump into the wheel brakes.

It is provided by the invention that after the actuation of the pressure increasing unit, a dynamic pressure is produced upstream of the separating valve and at least clearances in the system are overcome and brake linings are applied to brake drums or brake discs, respectively. This means that pre-filling of the wheel brakes and application of the brake linings by means of the pressure generated by the motor is arranged for, with the separating valve open. According to the invention, the pressure develops due to a dynamic pressure in the system during pressure buildup by way of the pump. Due to the brake linings applied, the dynamics and more particularly the response behavior of the brake system of the invention in the low-pressure range is enhanced. The system also offers a high pedal comfort of the brake pedal because pressure buildup is adjustable in conformity with a desired characteristic curve. Besides, it is additionally possible to generate a very low brake pressure of a few bar, preferably 1 to 2 bar, though, in particular when a suspected emergency braking situation is detected.

It is arranged for according to the invention that the separating valve remains open at least so long until it is found out that the driver has initiated the braking operation.

According to the invention, the initiation of the braking operation by the driver is detected when the driver touches the brake pedal, applies a defined force to the brake pedal, and/or it is detected that the brake pedal covers a defined distance from its inactive or initial position in the actuating direction.

It is arranged for according to the invention that the separating valve remains open for a predetermined time period.

It is arranged for according to the invention that the time period of the opening of the separating valve is variably adjusted in accordance with the brake pedal travel, the brake pedal speed, the brake pedal acceleration, and/or the pressure gradient at the tandem master cylinder.

It is arranged for according to the invention that the braking request of the driver is determined on the basis of a movement of the driver's foot before the braking operation.

It is provided by the invention that the braking request of the driver is determined on the basis of an accelerator pedal movement such as the accelerator pedal travel, accelerator pedal return speed, and/or accelerator pedal return acceleration, before the braking operation.

It is also provided according to the invention that the braking request of the driver is determined on the basis of the movement of the driver's foot when changing from the accelerator pedal to the brake pedal.

It is provided by the invention that the separating valve is a hydraulic valve, preferably an analogized valve. Corresponding actuation induces said valve to also adopt intermediate positions between a (fully) open position and a (fully) closed position and thus adjust a defined pressure gradient between the two sides of the valve at least in approximation.

Additional valve functions are further provided. This means that the valves can be configured as NO-valves open in their non-energized condition or NC-valves closed in their non-energized condition. Upon malfunction of the electric voltage supply of the system or a disturbance of electronic brake control, it is thus possible that the hydraulic connection between the pressure fluid supply reservoir and the pump is closed by an NC-valve and the hydraulic connection between the master cylinder and the wheel brakes is opened by means of an NO-valve, with the result that braking is reliably ensured at least by means of the driver's pedal force boosted by a vacuum brake booster, as the case may be.

The method is preferably part of a program of an electronic brake control unit for the vehicle brake system.

This object is further achieved by means of a generic brake system characterized in that a detection means is provided in order to detect a braking request of the driver or determine a suspected braking request of the driver, and in that an electronic evaluating unit for actuating the pump and the separating valve is provided which actuates the separating valve in order to open the connection to the pump and actuates the pump in order to generate hydraulic pressure when the braking request of the driver is detected or a suspected braking request of the driver is determined.

It is provided by the invention that the pressure side of the pump is connected to the wheel brake by way of a hydraulic conduit into which an inlet valve is inserted, the wheel brake of the vehicle is connected to the master brake cylinder by way of a hydraulic conduit into which an outlet valve is inserted, and that a pressure sensor is associated with the master brake cylinder and a wheel speed sensor is associated with the vehicle wheels.

BRIEF DESCRIPTION OF THE DRAWINGS

The FIGURE shows a device of the invention.

DETAILED DESCRIPTION OF THE PREFERRED EMBODIMENTS

Figure 1:
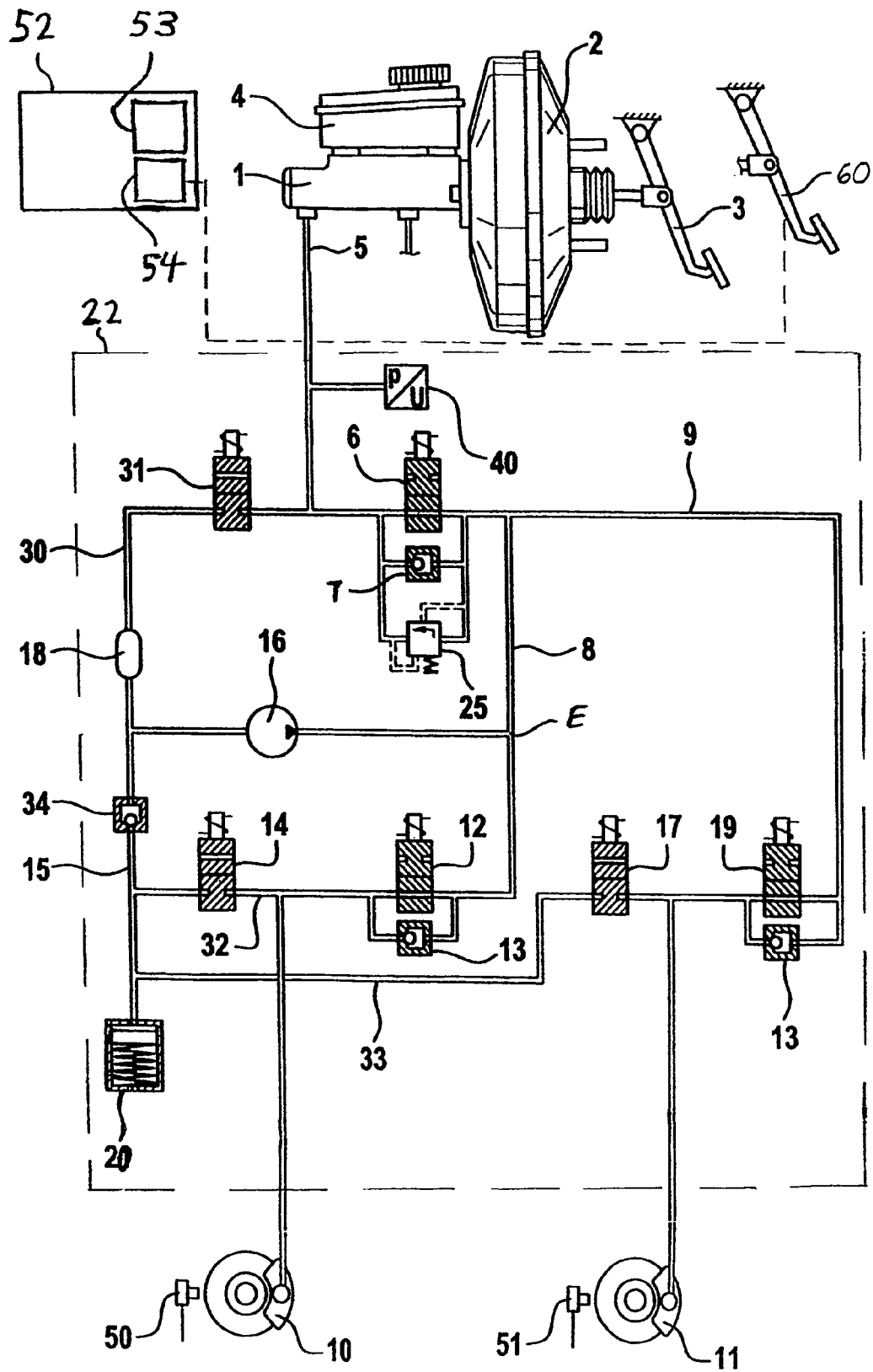

The dual-circuit brake system for motor vehicles shown in the FIGURE comprises an actuating unit 1, e.g. a tandem master brake cylinder (TMC) with a vacuum brake booster 2 actuated by a brake pedal 3. Arranged on the actuating unit 1 is a supply reservoir 4 containing a pressure fluid volume and being connected to the working chamber of the actuating unit in the brake's release position. The one brake circuit illustrated includes a brake line 5 connected to a working chamber of the actuating unit 1 and providing a connection between the actuating unit 1 and the one hydraulic unit 22. Brake line 5 includes a separating valve 6 forming an open passage for the brake line 5 in the inactive position. Connected in parallel to the separating valve 6 is a non-return valve 7 that opens in the direction of the wheel brakes 10, 11 and a pressure limiting valve 25. Said separating valve is also used herein as a pressure modulation unit. The separating valve 6 is usually actuated electromagnetically. Preferably, the separating valve is an analogized valve. In particular, this design renders possible a continuous 'analog' adjustment of the pressure or of a pressure reduction, respectively.

The brake line 5 branches into two brake lines 8, 9 respectively leading to a wheel brake 10, 11. Each of the brake lines 8, 9 contains an electromagnetically operable inlet valve 12, 19, which is open in its inactive position and can be switched into a closed position by energization of the actuating magnet. Connected in parallel to each inlet valve 12, 19 is a non-return valve 13 opening in the direction of the brake cylinder 1. Connected in parallel to these wheel brake circuits is a so-called return delivery circuit that comprises return lines 15, 32, 33 with a pump 16. By way of each one outlet valve 14, 17 through return lines 32, 33, the wheel brakes 10, 11 are connected to the return line 15 and, thus, to the suction side of the pump 16 whose pressure side is connected to the brake pressure line 8 in a mouth E between the separating valve 6 and the inlet valves 12, 19.

The pump 16 is preferably designed as a reciprocating piston pump with a pressure valve (not shown) and a suction valve. Pump 16 is used herein as a pressure increasing unit for generating the additional hydraulic brake force boosting. A low-pressure accumulator 20, comprised of a housing (not shown) with a spring and a piston, is arranged on the suction side of pump 16. A non-return valve 34 opening to the pump is inserted into the connection between the low-pressure accumulator 20 and the pump 16. The suction side of the pump 16 is connected to the brake cylinder 1 by way of a suction line 30 with a low-pressure damper 18 and a change-over valve 31. Further, the brake force transmitting circuit includes a pressure sensor 40 that is arranged in the brake line 5 between the brake cylinder 1 or change-over valve 31 and the separating valve 6. The brake cylinder pressure is detected and the introduced brake pressure determined by way of the pressure sensor 40. The wheel speeds are determined by the wheel rotational speed sensors 50, 51, and the signals are sent to an electronic brake control unit 52. Associated with the electronic control unit 52 is an evaluating unit 53 for actuating the pump 16 and the separating valve 6 according to a driver's request detection unit 54. The detection unit 54 detects a braking request of the driver or a suspected braking request of the driver. When the detection unit 54 detects a braking reauest of the driver or a suspected braking reauest of the driver, the evaluating unit 53 actuates the separating valve 6 in order to open the connection to the pump 16 and actuates the pump 16 in order to generate hydraulic pressure. In the oreferred embodiment, the detection unit 54 is configured to monitor accelerator pedal 60 movement and determine the braking request of the driver or a suspected braking request of the driver on the basis of such accelerator pedal 60 movement, for example, the accelerator pedal travel, accelerator pedal return speed, and/or accelerator pedal return acceleration before the braking operation.

The brake system operates as follows:

When the driver's request detection unit 54 detects the driver's braking request, then the evaluating unit 53 will actuate the pump 16 and open the separating valve 6, whereby low pressure is built up that is sufficient to overcome the clearances and apply the brake linings of the wheel brake 10, 11. When the driver increases the brake fluid pressure in the system by way of the actuating unit 1 with the vacuum brake force booster 2, the pump is actuated for the purpose of additional pressure increase in the wheel brakes by means of the electronic control unit 52, as the case may be, only when a point of maximum boosting of the vacuum brake booster 2 is reached or exceeded. Thus, the pump fulfils the function of an additional, active hydraulic brake force boosting. When the brake pressure introduced into the system and the wheel brakes reaches or exceeds a value and when the wheels are transferred into brake slip, then ABS control will be initiated by the electronic control unit 52 in response to the signals of the wheel speed sensors 50, 51, and the inlet and outlet valves 12, 14, 17, 19 are actuated correspondingly.

The invention claimed is:

1. A method of controlling a hydraulic vehicle brake system with active hydraulic brake force boosting, wherein brake pressure is introduced into a master brake cylinder by means of an actuating device and the introduced pressure is boosted by means of an active hydraulic pressure increasing unit, comprising:

monitoring movement of an accelerator pedal;

detecting a braking request or a suspected braking request based on accelerator pedal movement, opening or maintaining open a separating valve arranged in a line interconnecting the master brake cylinder and the hydraulic pressure increasing unit and actuating the pressure increasing unit in response to the detection of a braking request or a suspected braking request;

monitoring a brake pedal to detect initiation of a braking operation; and maintaining the separating valve open until it is detected that a braking operation has been initiated.

2. Method as claimed in claim 1, wherein a braking request or a suspected braking request is detected based on accelerator pedal travel, accelerator pedal return speed, or accelerator pedal return acceleration before the braking operation.

3. Method as claimed in claim 1, wherein after the actuation of the pressure increasing unit, dynamic pressure is produced upstream of the separating valve and at least clearances in the system are overcome and brake linings are applied to brake drums or brake discs, respectively.

4. Method as claimed in claim 1, wherein initiation of a braking operation is detected when the brake pedal is moved in the actuating direction a defined distance from an initial position or a defined force is applied to the brake pedal.

5. Method as claimed in claim 1, wherein the separating valve remains open for a predetermined time period after it is detected that a braking operation has been initiated.

6. Method as claimed in claim 1, wherein the separating valve is a hydraulic valve.

7. Method of controlling a hydraulic vehicle brake system with active hydraulic brake force boosting, wherein brake pressure is introduced into a master brake cylinder by means of an actuating device and the introduced pressure is boosted by means of an active hydraulic pressure increasing unit, comprising:

monitoring movement of an accelerator pedal;

detecting a braking request or a suspected braking request based on accelerator pedal movement, opening or maintaining open a separating valve arranged in a line interconnecting the master brake cylinder and the hydraulic pressure increasing unit and actuating the pressure increasing unit in response to the detection of a braking request or a suspected braking request;

monitoring a brake pedal, and wherein a duration in which the separating valve is maintained opened is variably adjusted in accordance with a detected brake pedal travel, a detected brake pedal speed, a detected brake pedal acceleration, or a pressure gradient at the master cylinder.

8. A hydraulic brake system for vehicles comprising:

a master brake cylinder operable by means of an actuating device;

at least one pump whose pressure can be applied to at least one wheel brake of the vehicle for the purpose of generation of hydraulic brake force boosting, the pump is connected to the master brake cylinder by way of a first hydraulic conduit;

a separating valve positioned along the first hydraulic conduit;

a detection unit configured to detect a braking request or a suspected braking request; and an evaluating unit configured to actuate the separating valve to an open position and actuate the pump to generate hydraulic pressure in response to the detection of a braking request or a suspected braking request and to further maintain the separating valve open until it is detected that a braking operation has been initiated.

9. The hydraulic brake system of claim 8, wherein the detection unit detects a braking request or a suspected braking request based on movement of an accelerator pedal.

10. The hydraulic brake system of claim 9, wherein the detection unit detects a braking request or a suspected braking request based on travel of the accelerator pedal, accelerator pedal return speed, or accelerator pedal return acceleration before the braking operation.

* * * * *